(12) United States Patent
Chang et al.

(10) Patent No.: US 10,795,426 B2
(45) Date of Patent: *Oct. 6, 2020

(54) DISPLAY DEVICE AND DISPLAY SYSTEM WITH POWER-SAVING MECHANISM

(71) Applicant: Novatek Microelectronics Corp., Hsinchu (TW)

(72) Inventors: Hsin-Yi Chang, Hsinchu (TW); Jen-Ta Yang, Hsinchu County (TW); Min-Jung Chen, Taipei (TW)

(73) Assignee: Novatek Microelectronics Corp., Hsinchu (TW)

( * ) Notice: Subject to any disclaimer, the term of this patent is extended or adjusted under 35 U.S.C. 154(b) by 907 days.

This patent is subject to a terminal disclaimer.

(21) Appl. No.: 14/447,627

(22) Filed: Jul. 31, 2014

(65) Prior Publication Data

US 2014/0340384 A1 Nov. 20, 2014

Related U.S. Application Data

(63) Continuation of application No. 12/014,083, filed on Jan. 14, 2008, now Pat. No. 9,024,931.

(30) Foreign Application Priority Data

Nov. 2, 2007 (TW) ................................ 96141563 A

(51) Int. Cl.
*G06F 1/3234* (2019.01)
*G09G 3/36* (2006.01)
(Continued)

(52) U.S. Cl.
CPC .......... *G06F 1/3265* (2013.01); *G06F 1/3218* (2013.01); *G09G 3/3406* (2013.01);
(Continued)

(58) Field of Classification Search
CPC .... G09G 1/3218; G09G 1/3237; G09G 1/324; G09G 1/3262; G09G 1/3265;
(Continued)

(56) References Cited

U.S. PATENT DOCUMENTS 6,680,732 B2 * 1/2004 Yoo ............................... 345/173
9,024,931 B2 * 5/2015 Chang et al. ................. 345/211
(Continued)

*Primary Examiner* — David Tung
(74) *Attorney, Agent, or Firm* — JCIPRNET

(57) ABSTRACT

A display device includes an image receiving unit, a power-saving control device, a display control unit, and a backlight module control unit. The power-saving control device judges whether or not received frames are still for a predetermined time. If the power-saving control device judges that the received frames are still for the predetermined time, the power-saving control device outputs a first control signal to the display control unit for controlling the display panel to perform power saving to reduce its power consumption while continuing displaying frames, and the backlight module control unit controls the backlight module to continue providing the backlight; while if the received frames are not still or are still for a time shorter than the predetermined time, the power-saving control device does not output the first control signal to the display control unit for controlling the display panel to perform power saving to reduce its power consumption.

7 Claims, 8 Drawing Sheets

(51) Int. Cl.
*G09G 3/34* (2006.01)
*G06F 1/3218* (2019.01)

(52) U.S. Cl.
CPC ..... *G09G 3/3696* (2013.01); *G09G 2330/021* (2013.01); *G09G 2360/08* (2013.01); *G09G 2360/14* (2013.01)

(58) Field of Classification Search
CPC ......... G09G 3/3406; G09G 2310/0213; G09G 2330/021; G09G 2330/022
See application file for complete search history.

(56) References Cited

U.S. PATENT DOCUMENTS

| | | | |
|---|---|---|---|
| 2001/0005193 A1* | 6/2001 | Yokoyama | 345/92 |
| 2002/0186212 A1* | 12/2002 | Matsumoto et al. | 345/204 |
| 2003/0030618 A1* | 2/2003 | Jones | 345/102 |
| 2005/0068289 A1* | 3/2005 | Diefenbaugh | G09G 3/3406 345/102 |
| 2005/0237294 A1* | 10/2005 | Miyachi | 345/102 |
| 2006/0008158 A1* | 1/2006 | Sawabe | 382/232 |
| 2006/0101293 A1* | 5/2006 | Chandley et al. | 713/300 |
| 2006/0267972 A1* | 11/2006 | Yi | 345/211 |
| 2007/0001999 A1* | 1/2007 | Smith et al. | 345/102 |
| 2007/0103424 A1* | 5/2007 | Huang | G09G 3/342 345/102 |
| 2008/0143695 A1* | 6/2008 | Juenemann | G09G 3/3611 345/204 |

\* cited by examiner

DISPLAY DEVICE AND DISPLAY SYSTEM WITH POWER-SAVING MECHANISM

CROSS-REFERENCE TO RELATED APPLICATION

This application is a continuation application of and claims the priority benefit of a prior application Ser. No. 12/014,083, filed on Jan. 14, 2008. The prior application Ser. No. 12/014,083 claims the priority benefit of Taiwan application serial no. 96141563, filed on Nov. 2, 2007. The entirety of the above-mentioned patent application is hereby incorporated by reference herein and made a part of this specification.

BACKGROUND OF THE INVENTION

1. Field of the Invention

The present invention generally relates to a power-saving system of a display, and more particularly, to a power-saving mechanism of a display and control method using the same which is automatically executable without manual setting by a user.

2. Description of Related Art

In recent years, an increasing and increasing environmental awareness forces people to think much of saving energy. Therefore, all products related to using electrical power, such as mechanical equipments, household appliances and computer products, are designed targeting the object of the highest efficiency by using the least power.

Taking a display device available on market today as an example, a display device usually is equipped with a power-saving mechanism which must be preset by a user through the operation system in use thereof. For example, through the setting of a power-saving operation mode provided by a computer operation system, a user is able to make the display device entering a power-preserving mode, where once the computer is not on duty for a while, the computer would control the display into a power-saving operation mode or the whole system would be shut off. However, the shortage of such a mechanism rests in that a user must purposely preset the operation mode. If the user does not preset the parameters for the mode in advance, the mechanism would fail to work to save energy.

On the other hand, in terms of a display in compliance of the Video Electronics Standard Association specification (VESA specification), once the computer connected to the display is not on duty for a too long period, the scalar controller of the display would be informed by the computer to be switched to a suspend mode, meanwhile the timing controller ("TCON" hereinafter) and the backlight source of the display would be shut off. The operation mode established by the VESA standard would cease all operations of the display at the time, which causes the user very inconvenient; because such architecture makes a display either on duty or off duty without other choices. Thus, in order to avoid a display from directly shutting off due to a brief pausing operation by a user, the preset time for the computer to shut off the display is quite long, which obviously makes the power-saving effect unexpected.

SUMMARY OF THE INVENTION

Accordingly, the present invention is directed to a smart power-saving system of a display, which is capable of solving the problem occurred with a prior art that a user is required to preset a shutdown time threshold. In contrast, the smart power-saving system of the present invention enters a power-saving mode whenever the frames of a display device are automatically judged still for a certain period.

The display with the power-saving mechanism provided by the present invention includes a power-saving control device for receiving a plurality of frame data successively displayed and judging whether or not to enter the power-saving mode according to the comparison of the frame data. When the display enters the power-saving mode, the power-saving control device outputs a control signal of display power-saving and a control signal of backlight power-saving respectively to a display control unit and a backlight module control unit so as to adjust the frames of the display panel and the light emitted by the backlight module.

The above-mentioned power-saving control device includes a first frame register, a second frame register, an adder, a content comparator and a power-saving controller. The first frame register and the second frame register are for registering the frame data sequentially obtained from the frame data successively displayed. The adder is for performing adding operation on the above-mentioned frame data to thereby output a frame difference value. The content comparator compares the frame difference value with the frame difference value obtained last time to get a counting value. When the counting value in a duration is greater than a preset number, a judgment result is obtained. The power-saving controller is connected to the content comparator; when the judgment result suggests the display should enter the power-saving mode, the control signal of display power-saving and the control signal of backlight power-saving are thereby output to the display control unit and the backlight module control unit for adjusting the frames of the display and the light intensity emitted from the backlight module.

In an embodiment, the present invention provides a control method for power-saving of display. First, a plurality of frame data successively displayed is received. According to a comparison of two successively displayed frame data, a comparison result is recorded. When the comparison result reaches the preset number in a duration, the display is controlled to enter the power-saving mode; meanwhile, the power-saving control device outputs a control signal of backlight power-saving so as to adjust the display frames to enter the power-saving mode.

The above-mentioned control signal of backlight power-saving is implemented by using pulse width modulation ("PWM") technique, where a control voltage is converted into a pulse signal, and the width, the number or the distribution rule of the pulse signal are changed so as to modify the backlight intensity and the frequency thereof used by the display.

The above-mentioned backlight intensity and the frequency thereof are controlled through controlling a CCFL (Cold Cathode Fluorescent Lamp) backlight module or an LED (light-emitting diode) backlight module of the display The above-mentioned control signal of backlight power-saving is implemented by using low-voltage DC control technique to change the backlight intensity and the frequency thereof of the display.

In an embodiment, the present invention provides a control method for power-saving of display having an overdrive function. First, an overdrive signal output after comparing two successively displayed frame data among a plurality of frame data successively displayed through the overdrive operation function is received. Next, the enabling status written by the overdrive signal is recorded and a counting value is obtained, wherein when the counting value reaches a preset number in a duration, the display enters the power-saving mode by controlling; meanwhile the power-saving control device outputs the control signal of backlight power-saving for adjusting the display frames to enter the power-saving mode.

The above-mentioned control signal of backlight power-saving is implemented by using PWM technique, where a control voltage is converted into a pulse signal, and the width, the number or the distribution rule of the pulse signal are changed so as to modify the backlight intensity and the frequency thereof used by the display.

The above-mentioned backlight intensity and the frequency thereof are controlled through controlling a CCFL backlight module or an LED backlight module of the display.

The above-mentioned control signal of backlight power-saving is implemented by using low-voltage DC control technique to change the backlight intensity and the frequency thereof of the display.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a diagram showing the power-saving mechanism.

DESCRIPTION OF THE EMBODIMENTS

Figure 1:
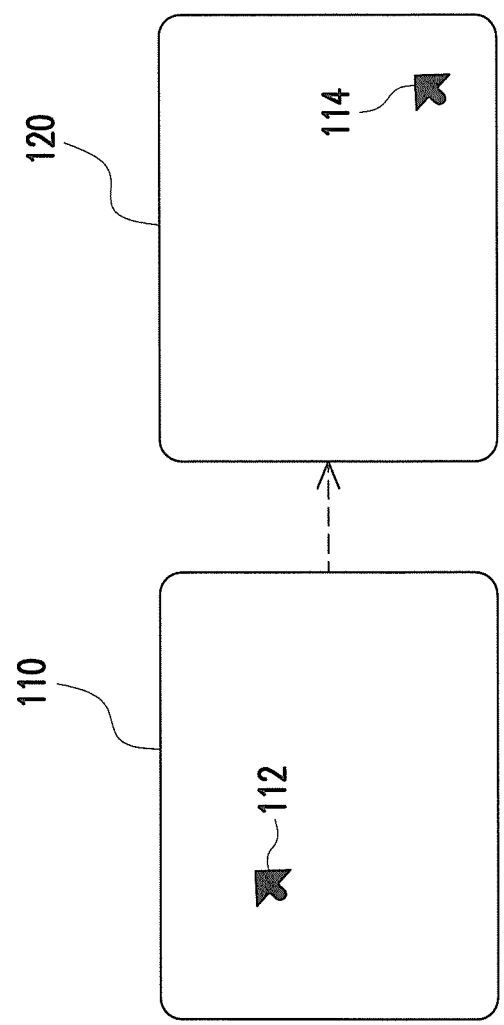
FIG. 1 and FIG. 2 are two diagrams of frames available for judgment by the display power-saving mechanism provided by the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a display power-saving mechanism, which does not need manual settings by a user that whether or not the display enters the power-saving mode or is shut off. The power-saving mechanism is able to automatically decide the display entering the power-saving mode once the frames of the display are found still for a certain time. The power-saving mechanism is implemented by the hardware architecture of the display, able to automatically judge whether or not to enter the power-saving operation status and without a user's setting.

The power-saving mechanism provided by the present invention can detect the frames of the display and perform a comparison of two displayed frame data among the successively displayed frames. If the change is less than a predetermined value, it is considered that the successively displayed frames may be still and then a counting value is used to count. When the counting value is greater than a predetermined value, it means the successively displayed frames are still for a continuous duration, or the change is quite little, so that the display is considered to be out of the operation of the user and may enter a so-called power-saving mode. The two frames among the successively displayed frames can be two frames successively displayed on the display, or two frames extracted in a certain time among the successively displayed frames. Both cases fall in the scope of the present invention and are suitable for all embodiments described hereinafter.

If it is detected that a user has no operation or the frames have no change for a duration, the power-saving mechanism of the present invention would control the light source device of the display, for example, a backlight module, so that the display enters the power-saving operation mode by reducing the operation frequency, reducing the display frequency of successively displayed frames or reducing the current and so on.

The power-saving mechanism of the present invention can be implemented by an independent component disposed inside the display. In an embodiment, the power-saving mechanism is implemented by a component or a circuit disposed in the controller of the display, or at a timing controller (TCON) or in a scalar, and so on. The power-saving mechanism can further have function of adjusting the operation status of the backlight module to achieve power-saving effect.

Figure 2:
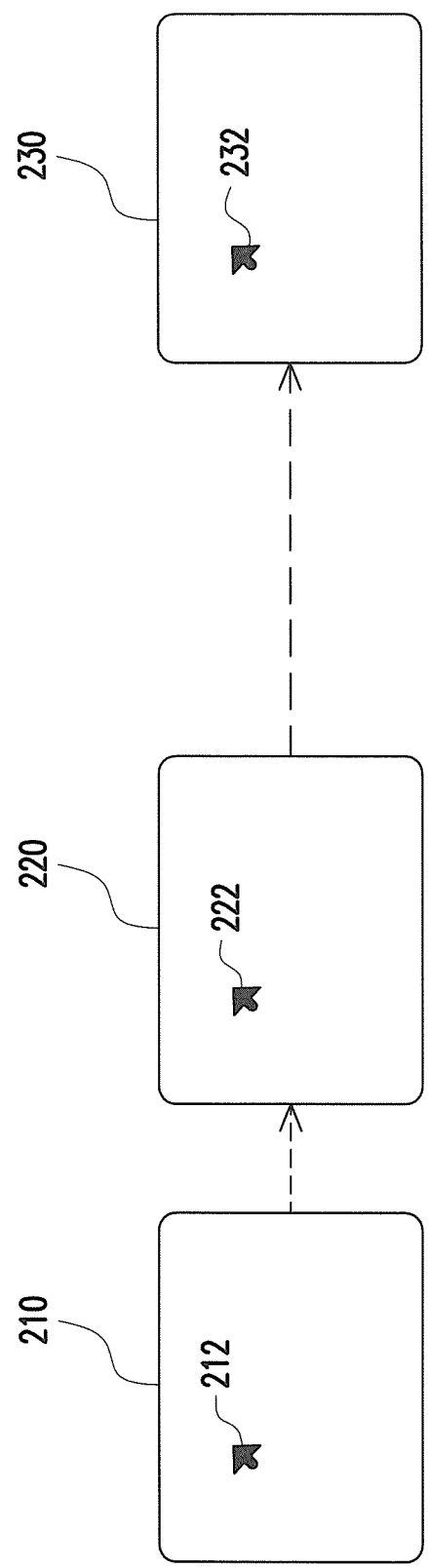

Referring to FIGS. 1 and 2, they are two diagrams of frames to describe the display power-saving mechanism provided by the present invention. In FIG. 1, two successively displayed frames 110 and 120 are shown. On the frame 110, there is a cursor 112 and on another frame 120 there is another cursor 114. On the two frames, the position of the cursor 112 is different from that of the cursor 114, which indicates a user is operating during that time, therefore, a counting value available for judging whether or not the above-mentioned frames are still would not be increased. The frames 110 and 120 herein are two frames among the successively displayed frames or two frames arbitrarily selected from the successively displayed frames, but the duration between two selected frames cannot be too long, in order to avoid a too slow judgment speed to get distortion. In an embodiment, the two frames are two ones successively displayed among the continuously displayed frames, but the present invention is not limited to.

In FIG. 2, several successively displayed frames are shown, where reference numbers 210, 220 and 230 represent three frames for description. In comparison of the three cursors 212, 222 and 232 respectively displayed on the frames 210, 220 and 230, it is obvious that the three cursors are located at a same position; therefore, the above-mentioned three frames are judged to take still status, and accordingly the counting value would keep increased until the counting value is greater than a threshold, where the user is considered inactive and the display is allowed to enter the so-called power-saving operation mode. It is clear that a display is able to automatically enter the power-saving operation mode by the judgment mechanism.

Figure 3:
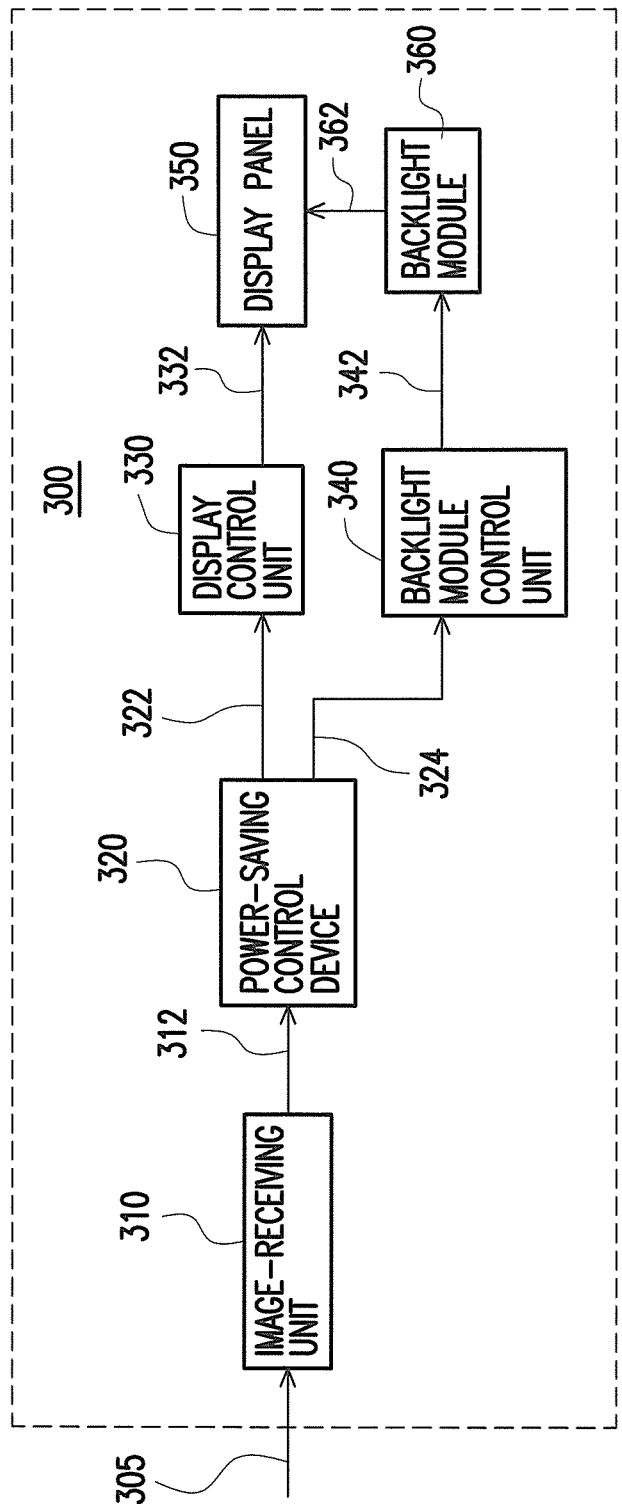
FIG. 3 is an architecture diagram of a display having the power-saving mechanism according to an embodiment of the present invention.

FIG. 3 is an architecture diagram of a display having the power-saving mechanism according to an embodiment of the present invention. Referring to FIG. 3, a display 300 includes an image-receiving unit 310, a power-saving control device 320, a display control unit 330, a backlight module control unit 340, a display panel 350 and a backlight module 360. The display control unit 330 sends a display control signal 332 to the display panel 350 for controlling the frame content thereof. The backlight module control unit 340 sends a backlight control signal 342 to the backlight module 360 for controlling the backlight intensity required by the display panel 350 to display frames. The display power-saving mechanism of the present invention is implemented by a component or a circuit disposed in the power-saving control device 320.

The power-saving control device 320 receives a plurality of frames obtained among the successively displayed frames for judging whether or not frames are still. If the frames of the display 300 are judged to be still for a predetermined time, the display automatically enters the power-saving operation mode. The component or circuit to implement the display power-saving mechanism is disposed in the hardware architecture of the display, which automatically decides whether or not the display enters the power-saving operation mode without the user's setting. If the power-saving control device 320 concludes the frames are still, a control signal of display power-saving 322 and a control signal of backlight power-saving 324 are respectively sent to the display control unit 330 and the backlight module control unit 340. Then, the display control unit 330 uses the display control signal 332 to adjust the display panel 350, and the backlight module control unit 340 uses the backlight control signal 342 to adjust the intensity or frequency of the light emitted from the backlight module 360. The power-saving adjustments of the display panel 350 and the backlight module 360 can be simultaneously conducted or only one of the power-saving adjustments of the display panel 350 and the backlight module 360 is conducted as per the real need.

The frames obtained among the successively displayed frames and received by the above-mentioned power-saving control device 320 comes from an image source 305, which can be connected to, for example, a video signal source of a computer host received by the display 300. In an embodiment, the received image data signals 312 are stored in the image-receiving unit 310 first, then, transferred to the power-saving control device 320.

Figure 4:
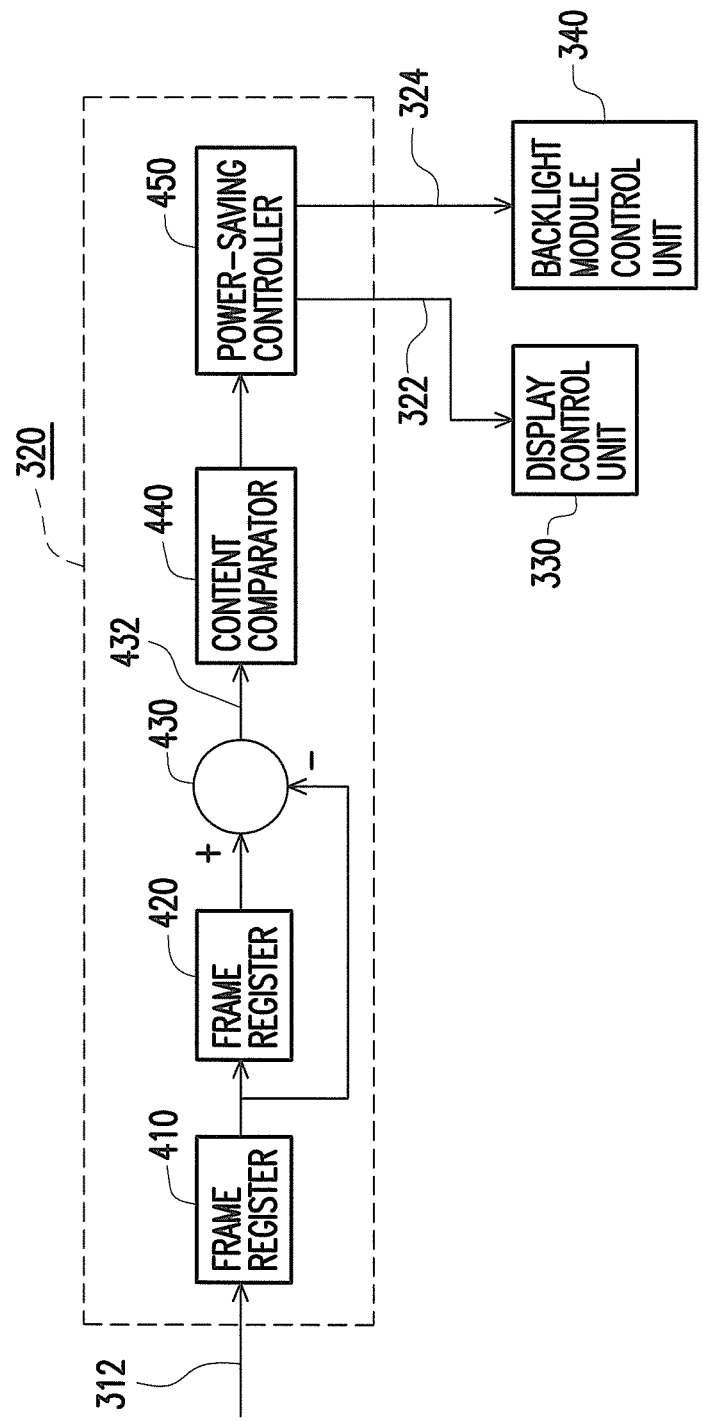
FIG. 4 is a circuit structure diagram of a power-saving control device 320 according to an embodiment of the present invention.

FIG. 4 is a circuit structure diagram of a power-saving control device 320 according to an embodiment of the present invention. Referring to FIG. 4, the power-saving control device 320 includes two frame registers 410 and 420, an adder 430 and a power-saving controller 450. The display control signal 312 include a plurality of frames obtained among the successively displayed frames, but only two successively displayed frames are exemplarily depicted herein. The two successively displayed frames are respectively stored in the frame registers 410 and 420; for example, the (N+1)-th frame is stored in the frame register 410 and the N-th frame is stored in the frame register 420. The thereafter image data signals 312 are similarly stored in the frame registers 410 and 420 in sequence. Then, the frame register 410 sends an output to the positive terminal of the adder 430 and the frame register 420 sends an output to the negative terminal of the adder 430. The adder 420 conducts a subtraction of the (N+1)-th frame content stored in the frame register 420 from the N-th frame content stored in the frame register 410 to obtain a result 432, and the result 432 is sent to a content comparator 440 which compares the present result with the last result to get a difference of the results, followed by sending the difference of the results to the power-saving controller 450, so that the power-saving controller 450 sends a control signal according to an adjustment mode to the display control unit 330 and the backlight module control unit 340 to adjust the display panel or the light intensity of the backlight module or the frequency thereof and so on. The above-mentioned adjustment mode can be selected according to the characteristics of the display panel or the backlight module, wherein the key to select a mode is to achieve the goal of power-saving so as to fall in the claim scope of the present invention.

Figure 5:
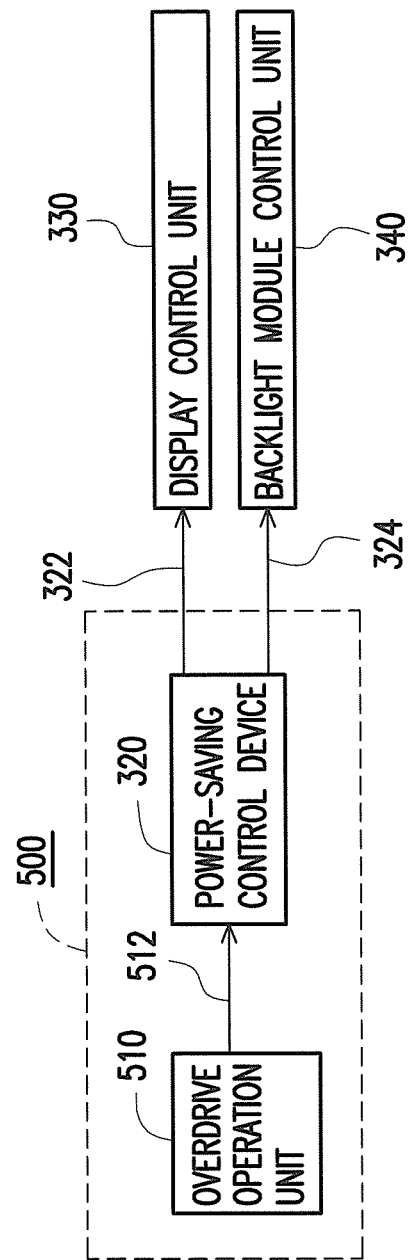
FIG. 5 is an architecture diagram of a display having the power-saving mechanism according to another embodiment of the present invention.

FIG. 5 is an architecture diagram of a display having the power-saving mechanism according to another embodiment of the present invention. Referring to FIG. 5, the major composition of FIG. 5 is similar to that of FIG. 4, except that the power-saving control device 320 in FIG. 5 receives an overdrive output signal 512 from an overdrive operation unit 510 without connecting a video signal source. A lot of displays today is equipped with the overdrive function; in particular, an LCD has the function, which is able to improve the reaction speed of liquid crystals through increasing an overdrive voltage. The overdrive operation is used to compare the difference between two successively displayed frames. An excessive change enables a driving voltage provided, and the comparison result is delivered to the display power-saving mechanism of the present invention so as to automatically control the power-saving operation. The above-mentioned power-saving control device 320 is connected to the overdrive operation unit 510, and both the power-saving control device 320 and the overdrive operation unit 510 can be disposed in the TCON or the scalar of the display to achieve the power-saving goal.

Note that if the disposed TCON or scalar having the display power-saving mechanism of the present invention does not have the overdrive function, it needs to increase the additional frame registers for achieving the power-saving effect.

Figure 6A:
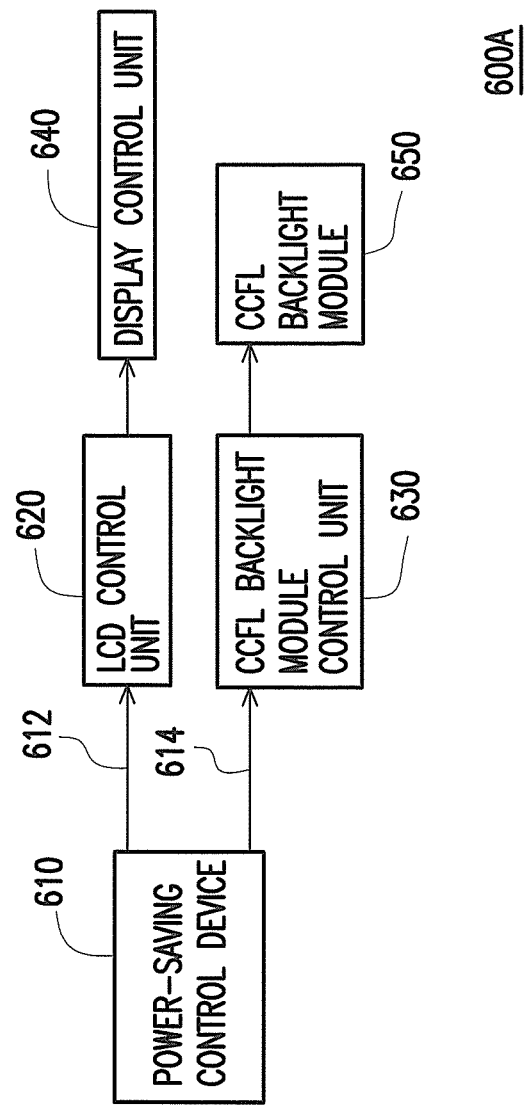
FIG. 6A and FIG. 6B are architecture diagrams showing the power-saving mechanism provided by the present invention and an LCD display employing the mechanism.
Figure 6B:
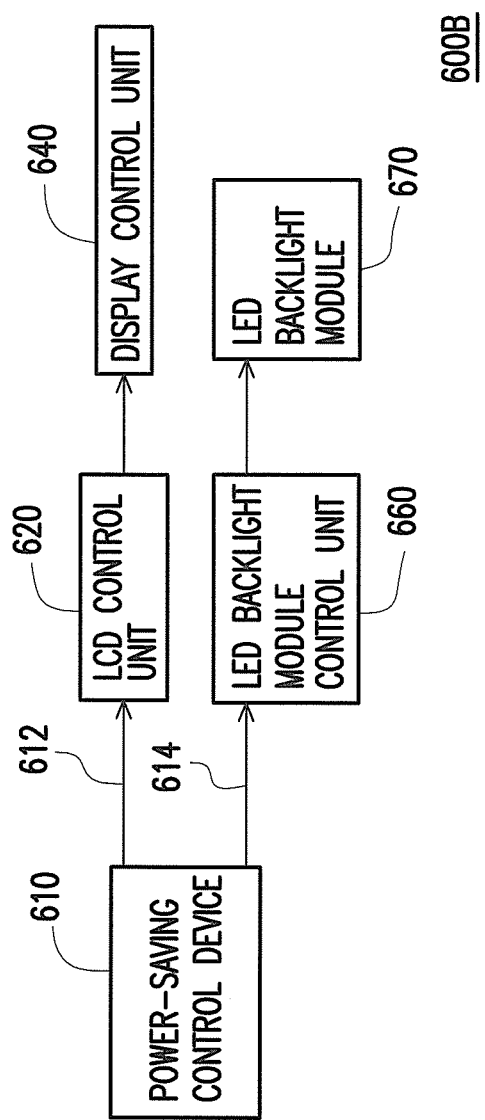

The architectures of the display power-saving mechanism applicable to an LCD of the present invention are shown by FIGS. 6A and 6B, wherein the backlight module in FIG. 6A is implemented by CCFL (cold cathode fluorescent lamp), while the backlight module in FIG. 6B is implemented by LED (light-emitting diode). Referring to FIG. 6A, in a display 600A, when a power-saving control device 610 concludes the frames of the display 600A are still, a control signal of display power-saving 612 and a control signal of backlight power-saving 614 would be respectively delivered to an LCD control unit 620 and a CCFL backlight module control unit 630, wherein the LCD control unit 620 is in charge of adjusting the displaying of the display panel 640 through a display control signal, while the CCFL backlight module control unit 630 is in charge of adjusting the light intensity or the frequency and so on emitted from a CCFL backlight module 650 through a backlight control signal. The control is implanted by using the PWM (pulse width modulation) technique or low-voltage DC technique. In the case using PWM technique, an output voltage of a current converter is converted into a pulse signal with a certain width, and the light intensity or the frequency and so on emitted from the CCFL backlight module 650 is controlled by changing the width, the number or the distribution rule of the pulse signal and thereby changing the amount and the frequency of the output voltage.

Referring to FIG. 6B, in a display 600B, when a power-saving control device 610 concludes the frames of the display 600B are still, a control signal of display power-saving 612 and a control signal of backlight power-saving

614 would be respectively delivered to an LCD control unit 620 and an LCD backlight module control unit 660, wherein the LCD control unit 620 is in charge of adjusting the displaying of the display panel 640 through a display control signal, while the LED backlight module control unit 660 is in charge of adjusting, for example, the driving current provided to the LEDs or others to thereby adjust the light intensity emitted from an LCD backlight module 670 through a backlight control signal.

Figure 7:
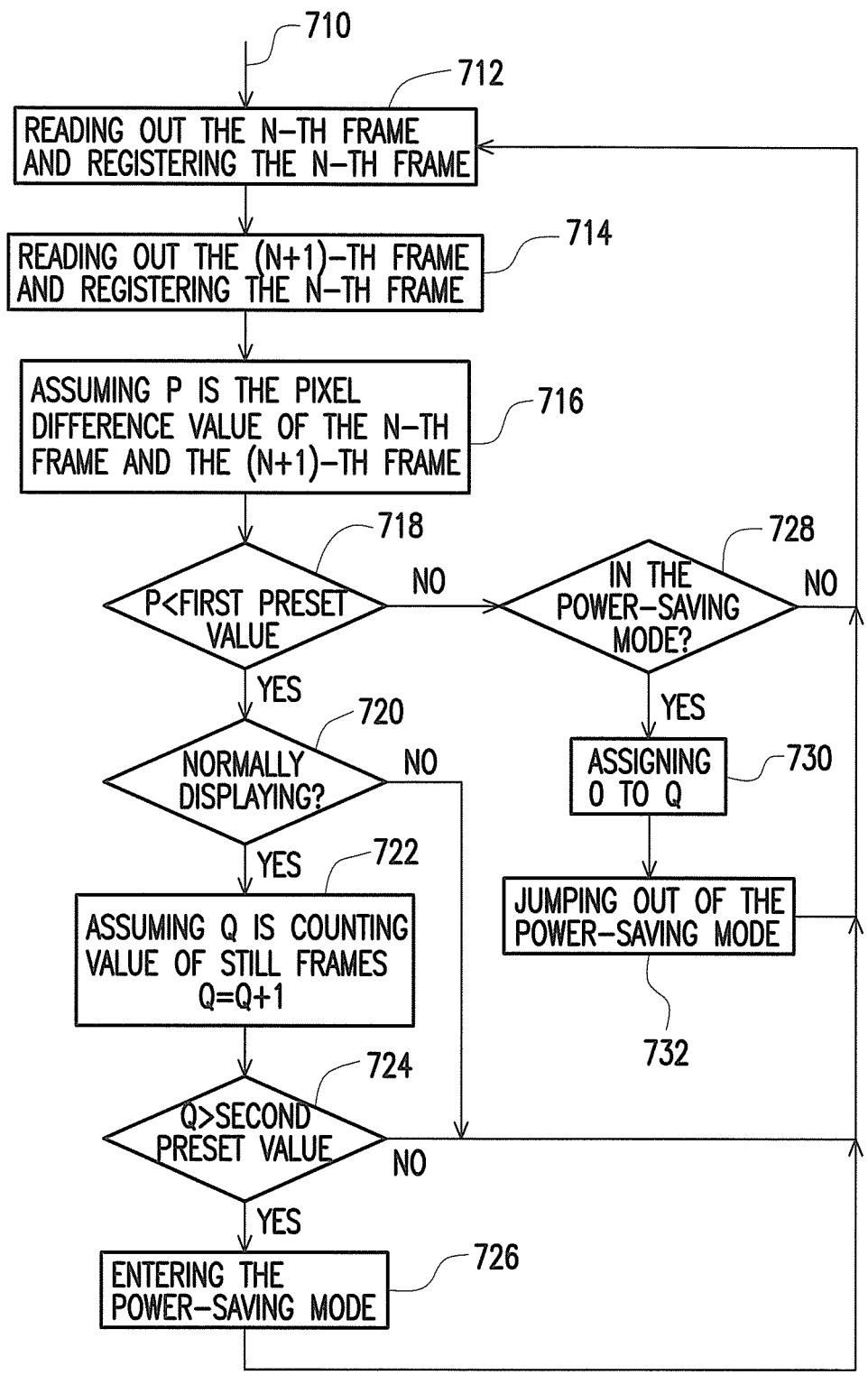
FIG. 7 is an operation step flowchart of the power-saving mechanism provided by the present invention.

FIG. 7 is an operation step flowchart of the power-saving mechanism provided by the present invention. In step 712, a video source signal 710 corresponding to the normal displaying is received and the data of an N-th frame is extracted and saved into a first frame register according to the display power-saving mechanism. In step 714, the data of an (N+1)-th frame is extracted and saved into a second frame register, wherein the N-th frame and the (N+1)-th frame are two successively displayed frames, but the present invention is not limited to.

In step 716, the pixel difference values of the N-th frame and the (N+1)-th frame are subtracted from one by another, and the subtraction result is assigned to a counting value P according to the display power-saving mechanism. In step 718, the counting value P is compared with a threshold of frame pixel difference (first preset value) set by the display power-saving mechanism. The first preset value is initiated by hardware or software, and a user is allowed to change the preset value by an interface or hardware input device. If the counting value P is less than the first preset value, the flowchart goes to step 720, otherwise goes to step 728.

In step 720 is corresponding to the case where the counting value P is less than the first preset value, i.e., the pixel difference between the N-th frame and the (N+1)-th is less than the threshold set by the display power-saving mechanism, which means the two frames have a little difference and are considered as two successively displayed still frames. Accordingly, it must be judged whether or not the screen of the display is in normal displaying status; if yes, the flowchart goes to step 722; if no, it implicates the display is in the power-saving operation mode already, it needs to keep the power-saving operation mode unchanged so as to keep the frames still and the flowchart returns back to step 712 to extract the successive frame data according to the display power-saving mechanism.

Step 722 is corresponding to such a situation that the frames are still but the number of the successively displayed still frames does not reach a level to start the power-saving operation mode. Therefore, a counting value Q is used to be accumulated by number '1', i.e., Q=Q+1. Then, in step 726, it is judged whether or not the counting value Q corresponding to the still frames is greater than a threshold of still frame number (a second preset value) set by the display power-saving mechanism. The second preset value is initiated by hardware or software, and a user is allowed to change the preset value by an interface or hardware input device. If the counting value Q is less than the second preset value, it means the still frame number is not accumulated to the required second preset value, so that there is no need to enter the power-saving operation mode at the time and the flowchart returns back to step 712 to continuously extract the next frame data.

When the counting value P is greater than the first preset value, it implicates the pixel difference value between the N-th frame and the (N+1)-th is larger, therefore, the successively displayed frames are not still ones by the judgment. In step 728, it is judged whether or not the display screen is in the power-saving operation mode; if, yes, the counting value Q is reset as zero, it is required to start accumulating the still frame number to update the counting value Q, the power-saving operation mode is disabled and the flowchart returns back to step 712 to continuously extract the next frame data; if no, the flowchart directly returns back to step 712 to continuously extract the next frame data.

In summary, the present invention is able to automatically achieve the power-saving function of an LCD panel by using the provided power-saving system without a user's setting. However, the user is also allowed to change the relevant setting by a software interface or hardware provided by the system, which brings users great usage flexibility.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device applicable to a display system having a display panel and a backlight module, comprising:
an image receiving unit, configured to receive a plurality of frames;
a power-saving control device, coupled to the image receiving unit, configured to judge whether or not the received frames are still for a predetermined time;
a display controller, coupled to the power-saving control device, configured to control the display panel to display frames; and
a backlight module controller, coupled to the power-saving control device, configured to control the backlight module to provide backlight, wherein
in response to the power-saving control device judges that the received frames are still for the predetermined time, the power-saving control device outputs a first control signal to the backlight module controller for controlling the backlight module to perform power saving to reduce power consumption of the backlight module while continuing providing the backlight, wherein a frequency of the backlight module is reduced to a non-zero frequency for the still frames for power saving by converting the control signal to a pulse signal and changing a width, a number or a distribution rule of the pulse signal while the backlight module is continuing providing the backlight, and in response to the power-saving control device judges that the received frames are not still or are still for a time shorter than the predetermined time, the power saving device does not output the control signal to the backlight module controller for controlling the backlight module to perform power saving to reduce power consumption of the backlight module.

2. The display device according claim 1, wherein the power-saving control device outputs the control signal to the backlight module controller for controlling the backlight module to lower the intensity of the backlight to reduce power consumption of the backlight module.

3. A display system, comprising:
a display panel;
a backlight module;
an image receiving unit, configured to receive a plurality of frames;
a power-saving control device, coupled to the image receiving unit, configured to judge whether or not the received frames are still for a predetermined time;

a display controller, coupled to the power-saving control device, configured to control the display panel to display frames; and a backlight module controller, coupled to the power-saving control device, configured to control the backlight module to provide backlight, wherein in response to the power-saving control device judges that the received frames are still for the predetermined time, the power-saving control device outputs a first control signal to the backlight module controller for controlling the backlight module to perform power saving to reduce power consumption of the backlight module while continuing providing the backlight, wherein a frequency of the backlight module is reduced to a non-zero frequency for the still frames for power saving by converting the control signal to a pulse signal and changing a width, a number or a distribution rule of the pulse signal while the backlight module is continuing providing the backlight and in response to the power-saving control device judges that the received frames are not still or are still for a time shorter than the predetermined time, the power saving device does not output the control signal to the backlight module controller for controlling the backlight module to perform power saving to reduce power consumption of the backlight module.

4. The display system according claim 3, wherein the power-saving control device outputs the control signal to the backlight module controller for controlling the backlight module to lower the intensity of the backlight to reduce power consumption of the backlight module.

5. A display device applicable to a display system having a display panel and a backlight module, comprising:

an image receiving unit, configured to receive a plurality of frames;

a power-saving control device, coupled to the image receiving unit, configured to judge whether or not the received frames are still for a predetermined time;

a display controller, coupled to the power-saving control device, configured to control the display panel to display frames, wherein in response to the power-saving control device judges that the received frames are still for the predetermined time, the power-saving control device outputs a first control signal for controlling the backlight module to perform power saving to reduce power consumption of the backlight module while continuing providing the backlight, wherein a frequency of the backlight module is reduced to a non-zero frequency for the still frames for power saving by converting the control signal to a pulse signal and changing a width, a number or a distribution rule of the pulse signal while the backlight module is continuing providing the backlight; and in response to the power-saving control device judges that the received frames are not still or are still for a time shorter than the predetermined time, the power saving device does not output the control signal for controlling the backlight module to perform power saving to reduce power consumption of the backlight module.

6. A controlling method configured to control a display device applicable to a display system having a display panel and a backlight module, comprising:

receiving a plurality of frames;

judging whether or not the received frames are still for a predetermined time;

controlling the display panel to display frames;

in response to the received frames are judged to be still for the predetermined time, outputting a control signal for controlling the backlight module to perform power saving to reduce power consumption of the backlight module while continuing providing the backlight, wherein a frequency of the backlight module is reduced to a non-zero frequency for the still frames for power saving by converting the control signal to a pulse signal and changing a width, a number or a distribution rule of the pulse signal while the backlight module is continuing providing the backlight; and in response to the received frames are judged to be not still or are still for a time shorter than the predetermined time, not outputting the control signal for controlling the backlight module to perform power saving to reduce power consumption of the backlight module.

7. The controlling method according claim 6, further comprising controlling the backlight module to provide backlight.

* * * * *